United States Patent
Grewal

(10) Patent No.: US 9,390,526 B2
(45) Date of Patent: Jul. 12, 2016

(54) METHOD, SYSTEM, AND COMPUTER PROGRAM PRODUCT FOR FORMING A RELATIVE LOCATION MAP BASED ON USER-SPECIFIED DECISION CRITERIA

(75) Inventor: Jasbir Grewal, Hounslow (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1032 days.

(21) Appl. No.: 13/298,983

(22) Filed: Nov. 17, 2011

(65) Prior Publication Data
US 2013/0127862 A1    May 23, 2013

(51) Int. Cl.
| | |
|---|---|
| *G06T 11/20* | (2006.01) |
| *G06Q 10/04* | (2012.01) |
| *G06Q 10/06* | (2012.01) |
| *H04L 12/753* | (2013.01) |
| *G06F 17/30* | (2006.01) |
| *H04L 12/733* | (2013.01) |
| *H04L 12/721* | (2013.01) |
| *H04L 12/727* | (2013.01) |

(52) U.S. Cl.
CPC ............ *G06T 11/206* (2013.01); *G06Q 10/04* (2013.01); *G06Q 10/0637* (2013.01); *G06F 17/30958* (2013.01); *H04L 45/12* (2013.01); *H04L 45/121* (2013.01); *H04L 45/122* (2013.01); *H04L 45/14* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,174,301 B2 | 2/2007 | Florance et al. | |
| 7,587,276 B2 | 9/2009 | Gold et al. | |
| 7,751,971 B2 | 7/2010 | Chang et al. | |
| 7,876,215 B1 | 1/2011 | Brady, Jr. | |
| 7,920,965 B1 | 4/2011 | Nesbitt et al. | |
| 7,953,548 B2 | 5/2011 | Vengroff et al. | |
| 2007/0055440 A1 | 3/2007 | Denker et al. | |
| 2010/0240391 A1* | 9/2010 | Povey | 455/456.1 |
| 2011/0208689 A1* | 8/2011 | Chakraborty et al. | 706/59 |
| 2012/0005631 A1* | 1/2012 | B'Far et al. | 715/854 |
| 2012/0143882 A1* | 6/2012 | Zheng et al. | 707/751 |
| 2013/0103297 A1* | 4/2013 | Bilek et al. | 701/120 |
| 2013/0297738 A1* | 11/2013 | Tarkoma | 709/217 |

* cited by examiner

*Primary Examiner* — Jwalant Amin
(74) *Attorney, Agent, or Firm* — Vista IP Law Group, LLP

(57) ABSTRACT

A method, system, and computer program product for decision-support tools (e.g., for merger, acquisition, and spin-off decision support) within an enterprise software suite for forming a relative location graph based on user-specified decision criteria. The method commences by selecting a subject user-specified managed location comprising at least a location data structure, and receiving user-specified criteria (e.g., number of employees, departments, etc.), the criteria having corresponding values retrieved using the data structure. One or more additional user-specified managed locations are selected, and relationships between the subject location and the additional locations are determined for use in a graphical representation (e.g., a visual aid to display on a display surface in a graphical user interface). A graph is formed with nodes representing managed locations, and edges representing the relationships of the additional locations to the subject location based on the user-specified criteria. Additional edges on the graph serve to display additional criteria.

21 Claims, 16 Drawing Sheets

METHOD, SYSTEM, AND COMPUTER PROGRAM PRODUCT FOR FORMING A RELATIVE LOCATION MAP BASED ON USER-SPECIFIED DECISION CRITERIA

FIELD

The disclosure relates to the field of decision support tools and more particularly to techniques for forming graphs based on user-specified decision criteria.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In the face of "data everywhere" and with broad access to map data (e.g., via the Internet), users are often faced with a confounding plethora of data when looking at data presented together with maps. Often a map is presented to a user where the map is both overly dense, and overly sparse. Consider a user searching for "waterfront eateries" (e.g., restaurants on the waterfront) in lower Manhattan. In such a case, almost any geographic area selected will at the same time be too dense (e.g., too dense in the vicinity of the waterfront itself), and too sparse (e.g., since there are no restaurants on the waterfront even a one block away from the waterfront).

Merely scaling the map linearly (e.g., via zoom-in or zoom-out) does not ameliorate the problem. Instead, what is needed are techniques for presenting location data using some meaningful scale other than mere geographic distances. And, such presentation needs to support decision-making by the user—specifically by presenting the needed location information, yet without obscuring the important criteria for decision-making.

Legacy systems have provided only rudimentary decision support and in some cases, the aforementioned legacy systems produce a plethora of information—much of which is unimportant to decision-making, and which plethora of information tends to obfuscate the decision-making process.

Some advanced legacy decision support systems have attempted to aid the user by superimposing the location data over an abstracted geographic map. Yet, such abstracted geographic maps, even when using overlay techniques are still deficient in that such techniques do not consider (possibly dispositive) decision criteria other than geography.

Improved techniques are needed to facilitate more flexible decision support, and to aid the user by displaying graphs and other user interface aids based on the decision criteria deemed as important to the user.

SUMMARY

The present disclosure provides an improved method, system, and computer program product suited to address the aforementioned issues with legacy approaches. More specifically, the present disclosure provides a detailed description of techniques used in decision support systems for forming a relative location graph that presents user-specified managed location attributes without presenting data unrelated to the decisions at hand.

Some embodiments involve merger-like activities (e.g., acquisition, merger, spin-off, etc.) that in turn might involve large numbers of personnel, and/or large numbers of work sites or other managed locations, and in such cases, decision-making can become a complex problem, demanding application of the claimed techniques.

In one embodiment, a method commences by selecting a subject user-specified managed location comprising at least a location data structure, and receiving user-specified criteria (e.g., number of employees, departments, site costs, access to public transport facilities, proximity to other services, etc.), the criteria having corresponding values retrieved using the data structure. One or more additional user-specified managed locations are selected, and relationships between the subject location and the additional locations are determined for use in a graphical representation (e.g., a visual aid to display on a display surface in a graphical user interface). A graph is formed with nodes representing managed locations, and edges representing the relationships of the additional locations to the subject location based on the user-specified criteria. Additional edges on the graph serve to display additional criteria.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for decision support using a relative location. More particularly, disclosed herein are techniques, environments, methods, and systems for forming a relative location graph based on selected decision criteria.

Overview

Figure 1A:
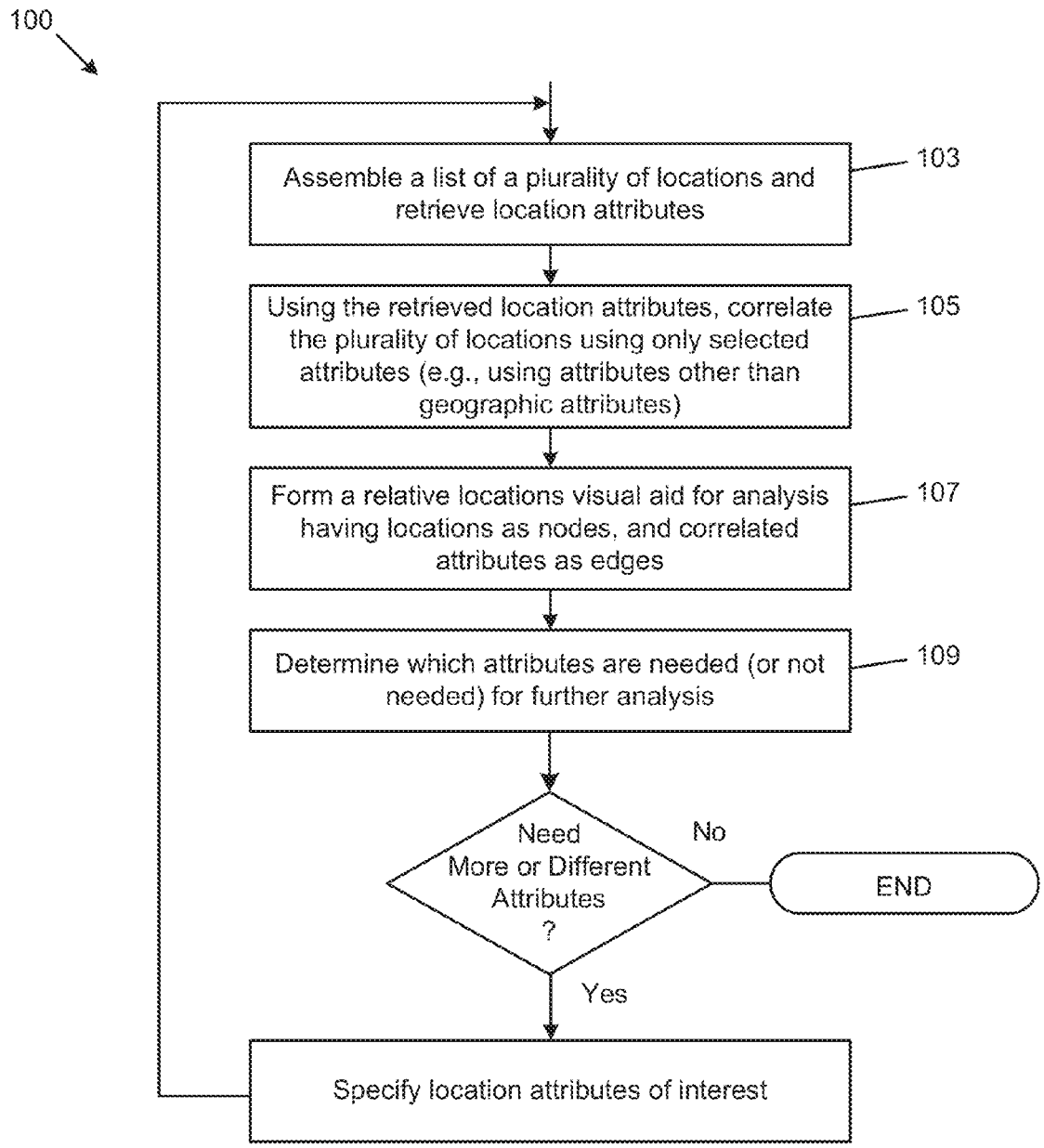
FIG. 1A is a flow chart of a method for forming a relative location graph, according to some embodiments.

FIG. 1A is a flow chart of a method for forming a relative location graph, according to some embodiments. As an option, the present a method 100 may be implemented in the context of the architecture and functionality of the embodiments described herein. Also, the method 100 or any operation therein may be carried out in any desired environment.

As shown, the method commences by assembling a list of locations (see operation 103), which locations may have any number of, or range of associated attributes (e.g., address, absolute GPS location, etc.). In some situations, a visual aid can be formed by juxtaposing and labeling the locations on a geographic map, and hiding or filtering unnecessary or obfuscating information from the geographic map to reveal only the desired attributes in the visual aid (see operation 105). However, in some situations (many of which are further described below), the aforementioned geographic map zoom-in and zoom-out techniques can be improved upon by placing the labeled nodes in a juxtaposition that is more strongly related to the attributes than to the geography. In the aforementioned "waterfront eateries" discussion, the nodes might be juxtaposed based on a "next hop" attribute, such that each node is presented on the visual aid as being adjacent to the next closest waterfront eatery, and the distance between the nodes on the visual aid is determined irrespective of the absolute geographic distance between the two eatery locations (see operation 107).

Further consider that a user might want to be more specific in analysis. Following the former example, a user might want to consider only eateries that also offer a vegan selection. Thus, the attribute "serves vegan selections" might result in elimination of some nodes on the visual aid (e.g., showing only eateries that "serves vegan selections"), with the shown nodes thus representing locations that are related to (e.g., satisfy) the sense of the specified attribute (see operation 109).

In the context of decision-support (many examples of which are discussed herein) a user might view the relative locations using the visual aid, and determine additional or different attributes to be used as decision criteria. In such as case, a user might specific additional or different attributes to be used, and re-render the visual aid (see return path to operation 103).

In some situations, a user might take an active role in the management of the locations, and can avail from the advantages of a visual aid reflecting only the attributes being used as decision criteria for managing the locations.

Figure 1B:
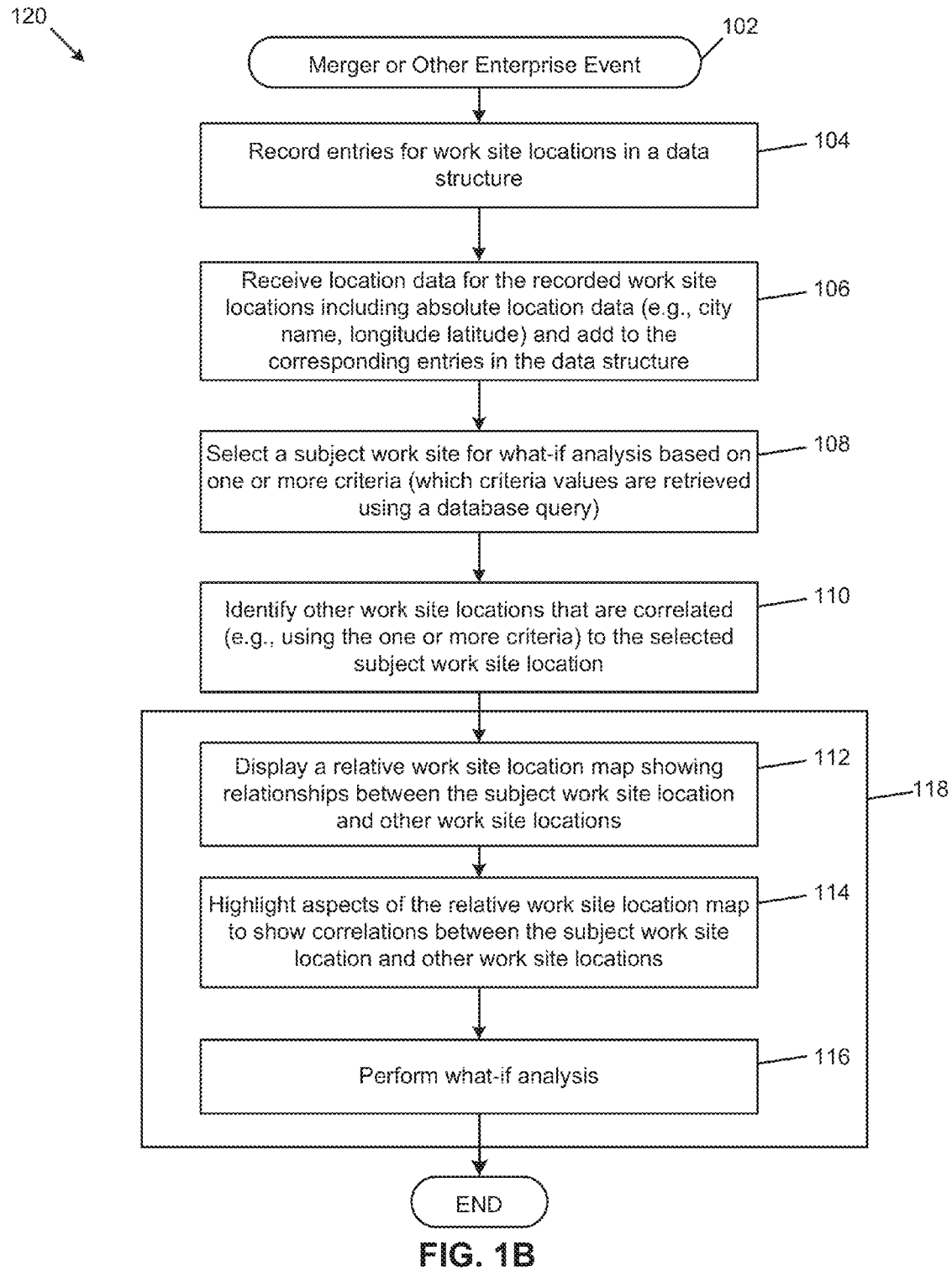
FIG. 1B is a flow chart of a method for forming a relative location graph based on user-specified managed location decision criteria, according to some embodiments.

FIG. 1B is a flow chart of a method for forming a relative location graph based on user-specified managed location decision criteria. As an option, the present a method 120 may be implemented in the context of the architecture and functionality of the embodiments described herein. Also, the method 120 or any operation therein may be carried out in any desired environment.

As earlier described, many situations are served by the use of relative location graphs. In the context of the fast pace of changes in business environments, and in the context of a global economy, mergers and acquisitions are becoming more and more frequent, as well as becoming larger and larger. In the face of such events, the managers are tasked with consolidating their enterprise locations or even looking for new locations. Indeed enterprises regularly undergo the process of mergers and acquisitions. In some cases the provisions of the merger precipitate study of the allocation of human capital as well as study of various resources in support of the human capital (e.g., office facilities, factories, remote offices, or any work locations, etc.). In some cases the merger may result in a situation of significant overlap, both in terms of human capital and in terms of facilities.

Some enterprise software addresses aspects of work site locations by merely providing access to location data (e.g., address, size of facility, etc.), or by merely superimposing icons showing the locations on a geographic map. While useful, such retrieval of location information and graphical displays can be augmented with other views to aid in the understanding of the overall merger situation.

Particularly within the context of large, complex mergers, improved visual aids can be useful in decision-making. The aforementioned technique for superimposing icons showing the work locations on a geographic map has it contribution, yet, the ever-increasing complexity of mergers suggests visual aids in the form of more illustrative maps or graphs based on user-specified decision criteria are needed.

Management personnel and their support staff (e.g., HR department staff, site managers, facilities managers, etc.) are tasked with the problem of optimizing the allocation of work locations and staff. In legacy cases, the optimization problem is relatively simple, and in such legacy cases, the solution might be as simple as "move all employees from acquired company 'SmallCo' to the headquarters of 'BigCo' and dispose of the non-human capital assets". However, in the era of globalization, both the acquiring entity and the acquired entity might have any number of managed locations (e.g., office facilities, factories, remote offices, or any work locations, etc.), and any one or more managed locations might be a part of a complex microcosm. Still more, business operations can be affected by local legislation. For example in countries like India, China, etc. government agencies may make certain resources available to a company, and the resources must be managed in accordance with the local rules and/or legislation.

Inasmuch as human resources, especially the highly skilled and specialized human resources found in successful globalized concerns, are a valuable and hard-to-replace asset, the transition of human resources in the course of the merger are given a great deal of consideration by the transition management team.

Nevertheless, in order to optimize to the benefit of the organization, personnel might need to be re-assigned to different work locations, and certain work locations might be closed (or expanded). Especially in the case that the aforementioned merger activities might involve large numbers of personnel, and/or large numbers of work sites, achieving an optimum re-allocation can become a complex problem.

As shown, the method 120 commences upon a merger event 102, which event in turn results in recording entries for work site locations in a data structure (see operation 104). The data structure can be stored in a database (see FIG. 1C) or can be stored any other persistent or non-persistent storage facility. In exemplary embodiments, the entry for a work site location stored in the data structure can include any characteristics of the work site location, possibly including characteristic values pertaining to the work site location, which can later be used in decision making. In still further embodiments, the data structure is stored in application tables (e.g., within a relational database system), and the application tables can be made accessible to other applications (e.g., transaction processor system, approval system, etc.).

In some cases certain characteristics of the work site location and corresponding values pertaining to the work site location might not be known at the time of performance of operation 104, and in such a case, such characteristics can be recorded in a subsequent operation (see the 'add' function of operation 106).

As aforementioned, after the merger event 102, and in order to optimize to the benefit of the organization, personnel might need to be re-assigned to different work locations, and certain work locations might be closed (or expanded). Accordingly, the method continues by allowing the user (e.g., a transition team member, HR personnel, etc.) to select a work site for consideration under what-if scenarios. Such what-if scenarios often include consideration of two or more work sites for analyzing if one or another work site should be consolidated, and such a consolidation assessment can be made on the basis of various criteria. Thus, the method 120 provides for performing work site what-if analysis on the basis of user-selected criteria (see operation 108). In some cases a consolidation decision might be reached due to overarching factors, for example, the strategy for handling work site locations after a merger might be articulated as, "close all acquired work sites, and bring the displaced employees to headquarters". However, in many situations the strategy is more complex, and decision-making includes assessment of multiple criteria, especially criteria that applies to a pair of work sites. For example, the decision to consolidate one work site location to another work site location might be made on the basis of the relative sizes of the affected departments. Accordingly, the method 120 provides for identification of other work site locations that are correlated; for example, correlated by the occurrence of and sizes of the affected departments (see operation 110). Retrieval of the correlated work site locations corresponding to the affected departments can be performed by retrieving the aforementioned data structures (e.g., via operation 106).

To ease the burden of analyzing data, a work site location map might be displayed to a user, and various relationships (e.g., distance, size of facility, nature of business performed at the work site, etc.) between sites might be shown to the user using graphical user interface techniques (see operation 112). Further, various characteristics of the displayed work site locations can be highlighted for ease of decision-making (see operation 114). In some embodiments, a group of work site locations might be displayed on a work site location map, and certain individual work sites can be highlighted on the basis of some correlated characteristics. For example, certain individual members of a group of work site locations such as work site locations within a particular city (or country) can be color-coded or otherwise highlighted to show the correlation. Or, for example, certain individual members of a group of work site locations, such as work site locations that host manufacturing activities, work site locations that host QA activities, and/or work site locations that host R&D activities, can be color-coded or otherwise highlighted to show the correlation of activities.

The operation to form and display the relative work site location map and the operation to highlight correlations between work sites serve to aid in what-if analysis (see operation 116), and the what-if analysis can result in the determination of how to handle the work site in the wake of the merger event. In actual use, the operations can be performed iteratively (see operation 118), and in various iterations a second or third, or Nth criteria might be selected for correlation and performance of what-if analysis on the basis of user-selected correlated criteria.

As can now be understood, various systems can be employed to implement all or portions of the method 120. Such a system is exemplified in FIG. 1C.

Figure 1C:
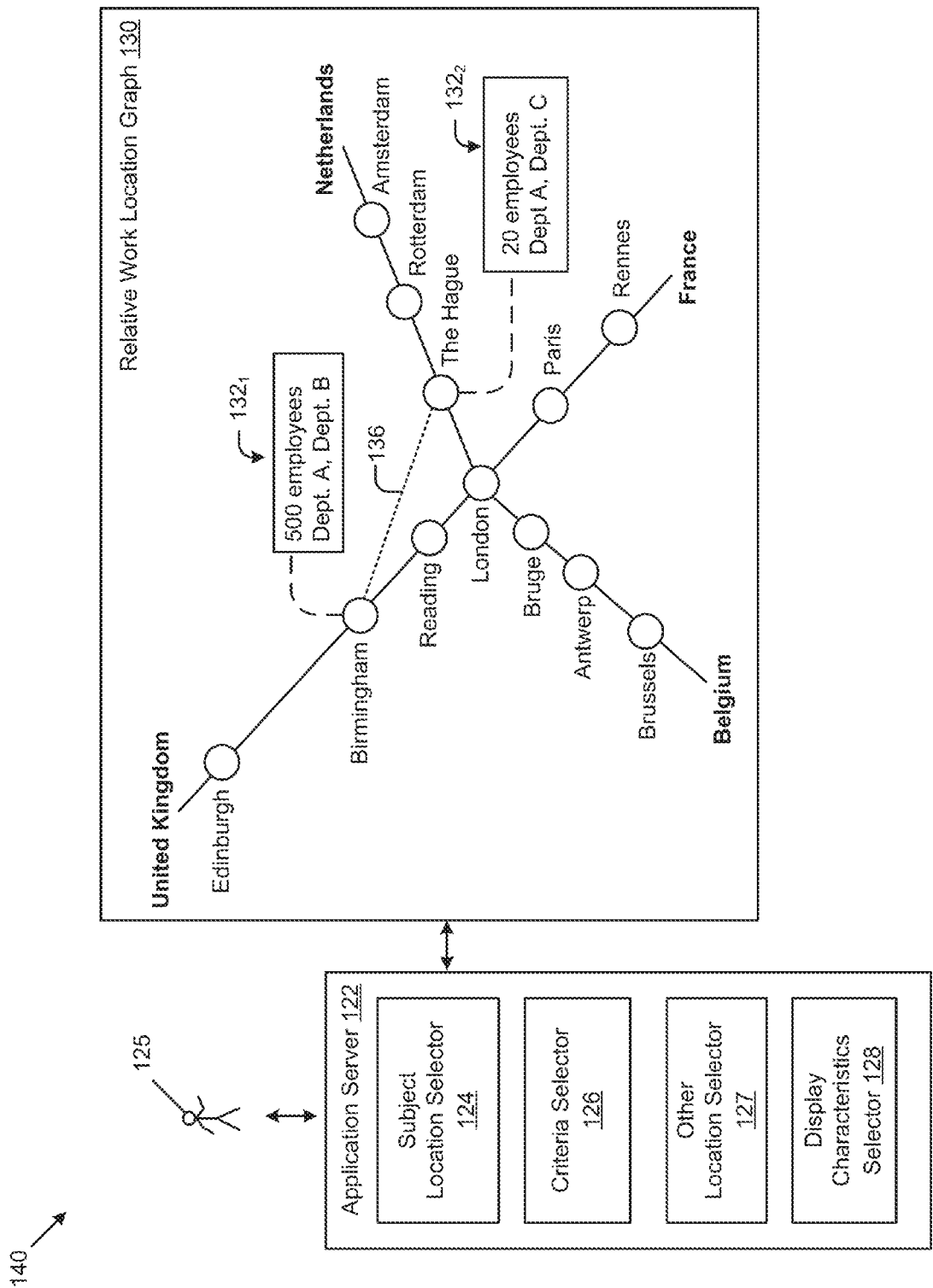
FIG. 1C is a block diagram of a system for forming a relative location graph based on user-specified managed location decision criteria, according to some embodiments.

FIG. 1C is a block diagram of a system for forming a relative location graph based on user-specified managed location decision criteria. As an option, the present system 140 may be implemented in the context of the architecture and functionality of the embodiments described herein. Also, the system 140 or any sub-system therein may be carried out in any desired environment. As shown, a user 125 (e.g., a business manager, an HR manager, a facilities manager, etc.) interacts with an application server 122, and the application server 122 serves to form a relative work location graph 130. The relative work location graph 130 is a graph depicting nodes corresponding work site locations (e.g., "London", "Reading", etc.) and having edges between nodes. In this example, some of the nodes are labeled with identifying labels (e.g., "London", "The Hague", etc.) as well as additional work site information presented using criteria labels (e.g., the shown node display characteristics $132_1$ and the shown node display characteristics $132_2$). Further, in this example, some of the edges are highlighted or otherwise presented with user-selected display characteristics (e.g., edge display characteristic 136). The identifying labels need not be geographically relevant; identifying labels can be defined based on any convenient naming (e.g., "Power Station A", "Defense Site B", etc.). Still further, a node in a relative location graph can be defined even when the existence of any infrastructure underlying the node is purely prophetic.

In this embodiment, the application server 122 comprises a subject location selector 124, a criteria selector 126, other location selector 127, and a display characteristics selector 128. The user interacts with the application server and constituent modules (e.g., the aforementioned selectors) to specify and alter the display characteristics of the relative work location graph 130. Purely as an example, a user might interact with a the subject location selector 124 to select work site locations of the acquiring enterprise, and then interact with the other location selector 127 to select one or more sites of the acquired enterprise, and might further interact with a criteria selector 126 to identify criteria. In the example shown the user can see the number of employees and the constituent departments for "Birmingham", and "The Hague" as is depicted using the node display characteristics $132_1$ and the node display characteristics $132_2$, respectively.

Figure 1D:
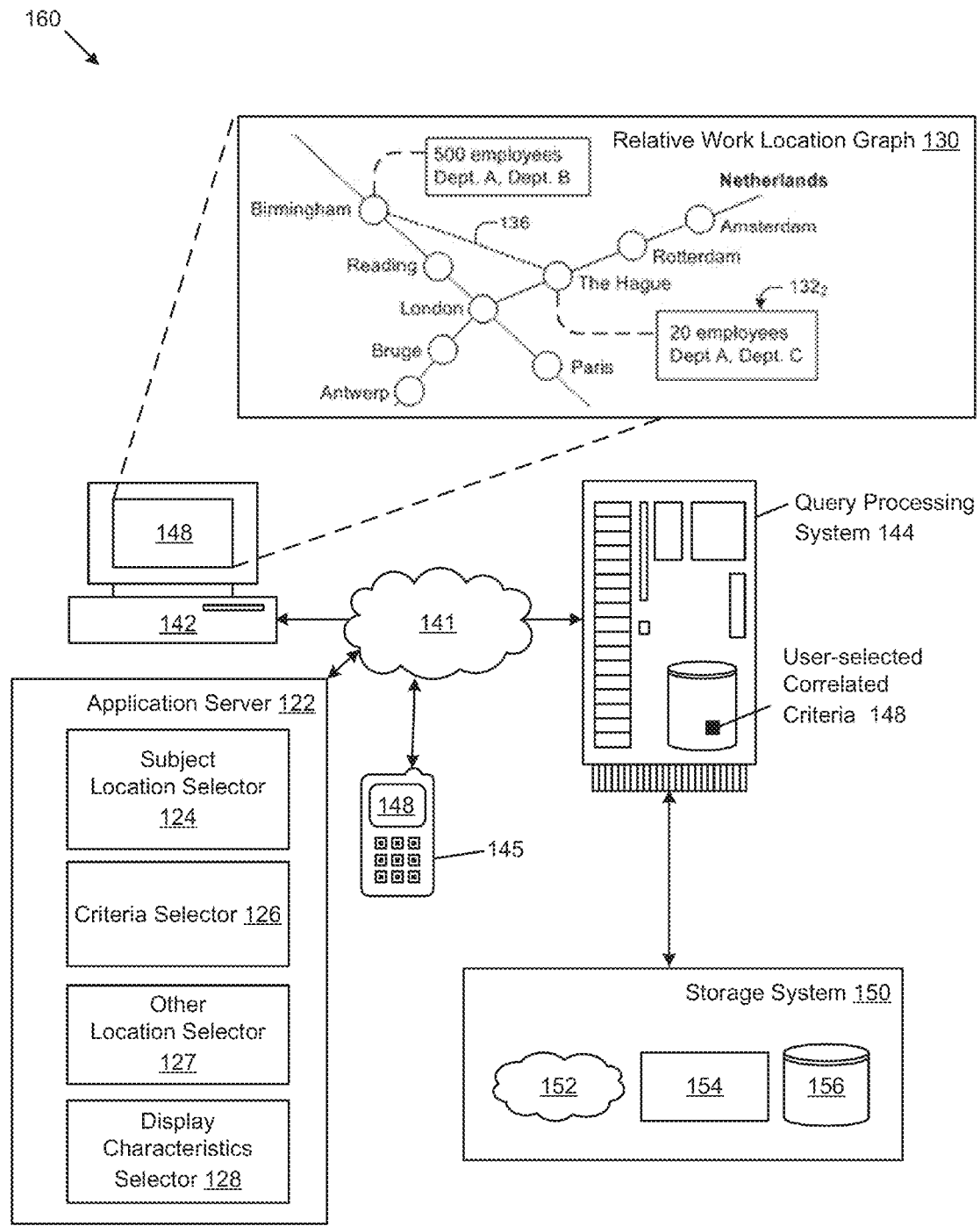
FIG. 1D is a block diagram of an environment for forming a relative location graph based on user-specified managed location decision criteria, according to some embodiments.

FIG. 1D is a block diagram of an environment for forming a relative location graph based on user-specified managed location decision criteria. As an option, the present an environment 160 may be implemented in the context of the architecture and functionality of the embodiments described herein. As shown, environment 160 includes a query processing system 144, a network 141 (e.g., a LAN or an intranet or the Internet), and several user terminals (e.g., user terminal 142 and mobile device 145). Also shown is an application server 122, which application server is configured to host selectors (e.g., subject location selector 124, criteria selector 126, other location selector 127, and a display characteristics selector 128). Any one or more of the components within the environment 160 (e.g., the application server 122), can serve for receiving from the user various forms of user-specified criteria. Additionally the application server, possibly in cooperation with other components within the environment 160, serve to form a relative work location graph which is turn is stored in volatile or non-volatile storage, and can be rendered on a display surface 148.

In preparing the aforementioned relative work location graph 130, one or more instances of a query processing system 144 serve for retrieving data structures, which data structures can comprise user-selected correlated criteria.

In certain cases, pre-computed data is stored in a cache for subsequent (and possibly repeated) quick access to such pre-computed data. Such caching can be extended to include any variety or combination of data. For example, an application server 122 can be configured to implement intermediate storage comprising a cache, and such a cache can be used to store any sorts of data, including any portions of the aforementioned pre-computed data, and/or any graphs or portions of graphs, and can store such data in non-volatile areas of storage within storage system 150. In addition to uses of a cache or caches for the purposes heretofore described, the cache can also be used for managing latency of access to persistent storage. For example, persistent storage can be formed by descriptions stored within files (e.g., in a file system found on storage device 156), or within relations 154 (e.g., within a relational database), or can be formed of data retrieved via a network or cloud 152.

Now, having heretofore described a method, system, and environment for forming and displaying a relative location graph based on user-specified managed location decision criteria, the descriptions as follows serve to elucidate some possible embodiments for facilitating effective what-if analysis.

Figure 2:
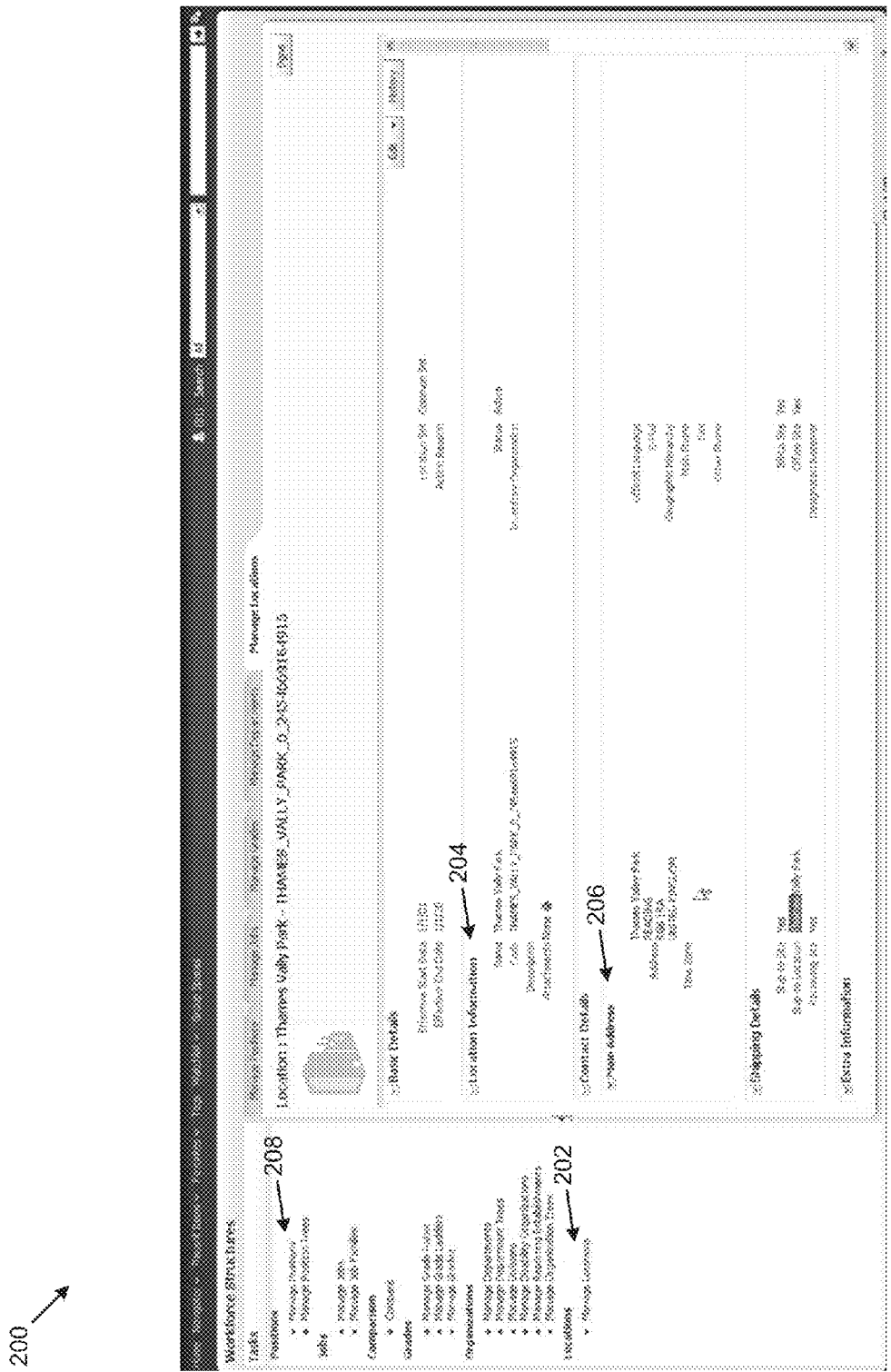
FIG. 2 depicts a portion of a user interface for forming a relative location graph based on user-specified managed location decision criteria, according to some embodiments.

FIG. 2 depicts a portion of a user interface for forming a relative location graph based on user-specified managed location decision criteria. As an option, the present user interface 200 may be implemented in the context of the architecture and functionality of the embodiments described herein. Also, the user interface 200 for managing locations within a module or any operation therein may be carried out in any desired environment.

As shown, the present user interface 200 comprises a web-based graphical user interface (GUI), however any one or more alternative techniques might be used to interact with a user 125 (e.g., a Flash™ interface, or a touch-screen interface). The shown web-based GUI presents various tools to manage locations, and the presented information includes a location information screen device 204 further comprising an address 206. A particular location can be selected using a location selector 202. In this embodiment, the web-based GUI also presents an option to manage positions (see manage positions widget 208).

As earlier mentioned, some enterprise software addresses aspects of work site locations by merely providing access to work location data (e.g., location information, address, etc.). While useful, such retrieval of work location information can be augmented with other views to aid in the understanding of the overall merger situation. For example, other views can be defined so as to allow the user to select multiple sites, possibly based on a query (see FIG. 3), and the multiple sites can be presented in a graphical form (see FIGS. 4A, and 4B) rather than in a tabular form as has been earlier described in the description of FIG. 2.

Figure 3:
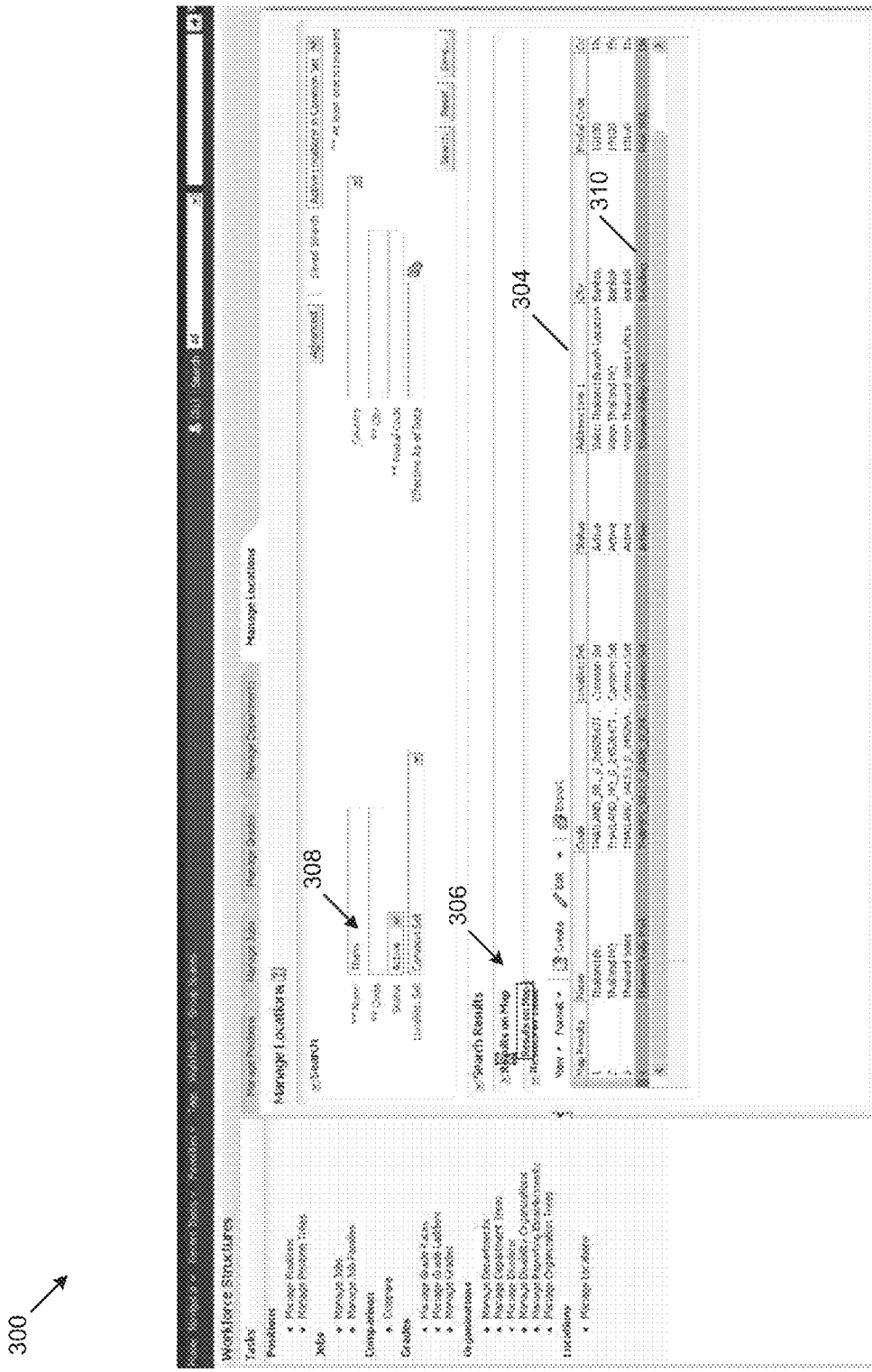
FIG. 3 depicts a portion of a user interface for forming a relative location graph based on user-specified managed location decision criteria, according to some embodiments.

FIG. 3 depicts a portion of a user interface for forming a relative location graph based on user-specified managed location decision criteria. As an option, the present a user interface 300 may be implemented in the context of the architecture and functionality of the embodiments described herein. Also, the user interface 300 for selecting managed locations within a module or any operation therein may be carried out in any desired environment. The present user interface 300 serves to aid in managing locations by facilitating the selection of one or more managed locations via a filter 308, which filter in turn is used as a portion of a query so as to return a result set containing all managed locations that correspond to the query. In the example shown, the filter text includes "Tha", which (in this case) returns search results in a list box 304, listing the three retrieved managed locations in "Thailand" and one managed location named "Thames Valley Park". The list box 304 facilitates user selection of one or more (or zero) managed locations. As shown, the bottom-most instance of the retrieved managed locations is a selected managed location 310. Of course the aforementioned filter of "Tha" is merely an example, and myriad other filters (e.g., "London") are envisioned and possible.

Also shown within the user interface 300 is a map request screen device for showing the search results on a map (see map request screen device 306). Such a map or maps can be presented in various graphical forms (see FIGS. 4A, and 4B). Further, such a map or maps can be presented in various graphical forms that are formed so as to capture all of the selected managed sites.

Figure 4A:
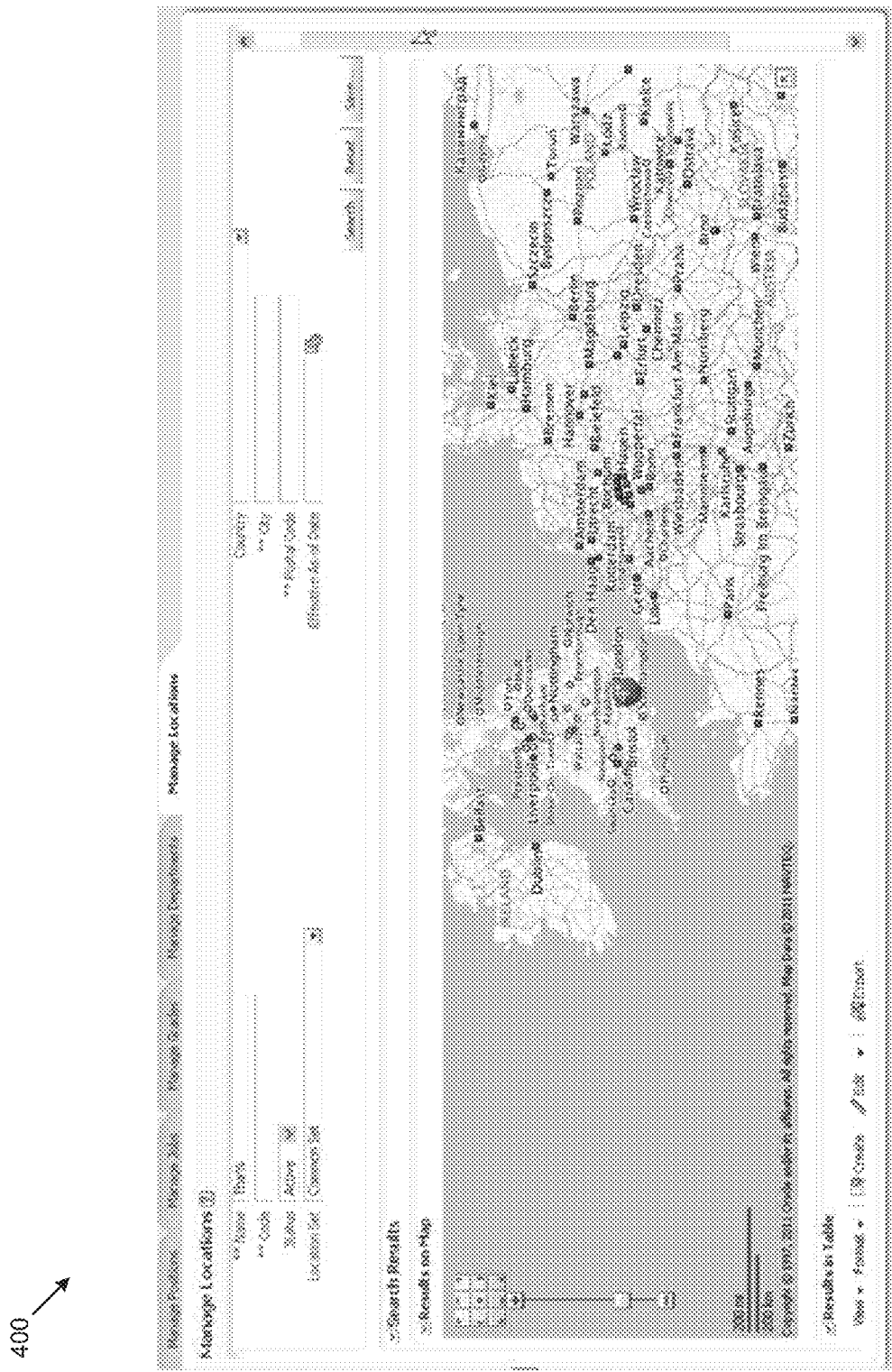
FIG. 4A depicts a portion of a region-wide geographic map for forming a relative location graph based on user-specified managed location decision criteria, according to some embodiments.

FIG. 4A depicts a portion of a region-wide geographic map for forming a relative location graph based on user-specified managed location decision criteria. As an option, the present a region-wide geographic map 400 may be implemented in the context of the architecture and functionality of the embodiments described herein. Also, the region-wide geographic map 400 for managing locations within a module or any operation therein may be carried out in any desired environment.

As shown, the region-wide geographic map 400 has a center point defined by the (one) selected managed site, namely the aforementioned "Thames Valley Park", which managed site is geographically situated in the London area. Thus, in this example the region-wide geographic map 400 shows the geographic region comprising the UK, parts of France and Benelux countries, and points beyond.

Yet, for performing what-if analysis, additional information may be desired by a user, and such additional information can be displayed by clicking on the node label (in this example, the node label is shown on the map as a "4" superimposed over the center of London).

Figure 4B:
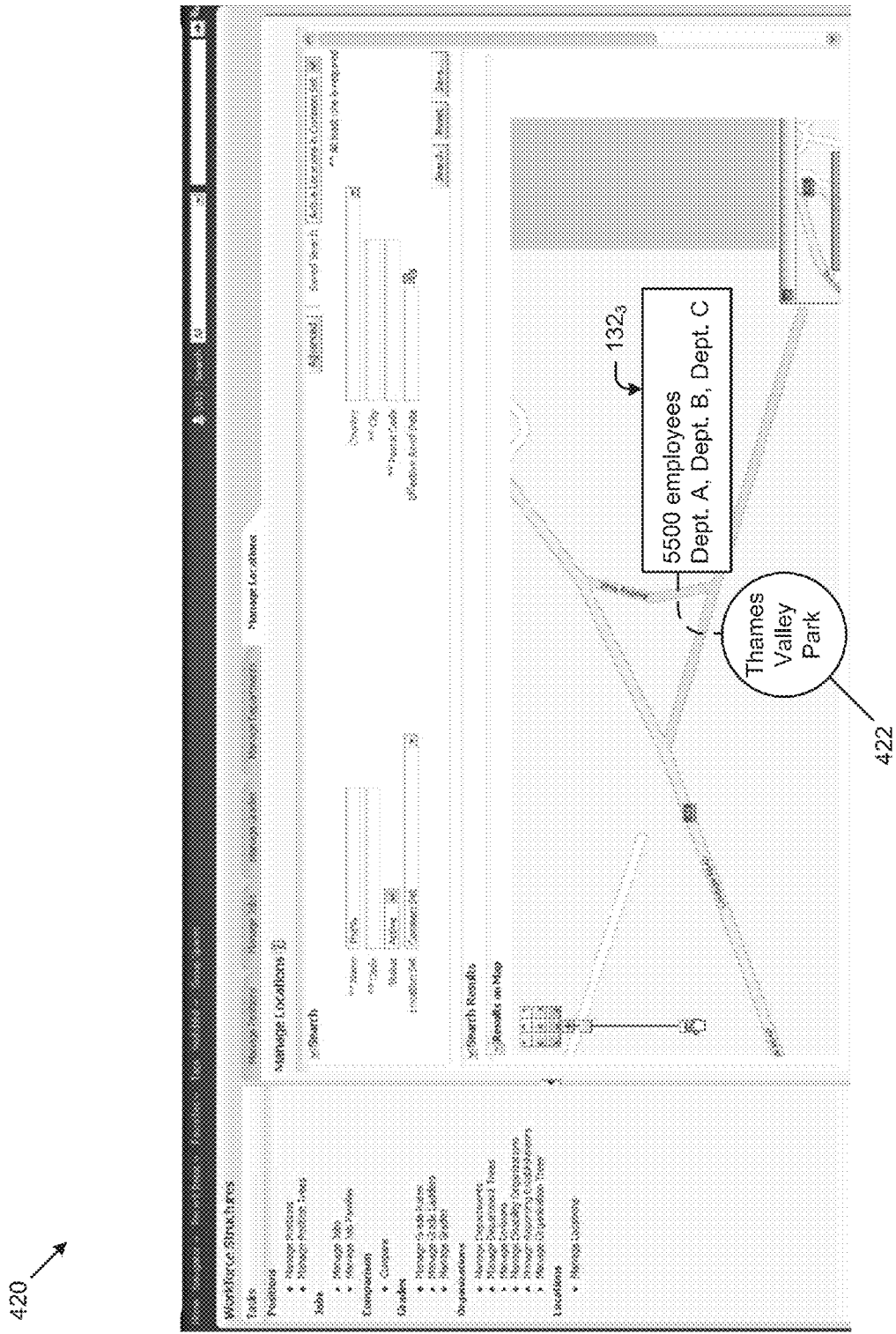
FIG. 4B depicts a portion of a street-level geographic map for forming a relative location graph based on user-specified managed location decision criteria, according to some embodiments.

FIG. 4B depicts a portion of a street-level geographic map for forming a relative location graph based on user-specified managed location decision criteria. As an option, the present a street-level geographic map 420 may be implemented in the context of the architecture and functionality of the embodiments described herein. Also, the street-level geographic map 420 for managing locations within a module or any operation therein may be carried out in any desired environment.

In this exemplary rendering, the shown geographic map is superimposed with the aforementioned additional information, which in this case is given by the default managed location information, namely the node 422, the number of employees, and a listing of departments hosted at that location (see the information depicted using node display characteristics $132_3$).

Figure 5A:
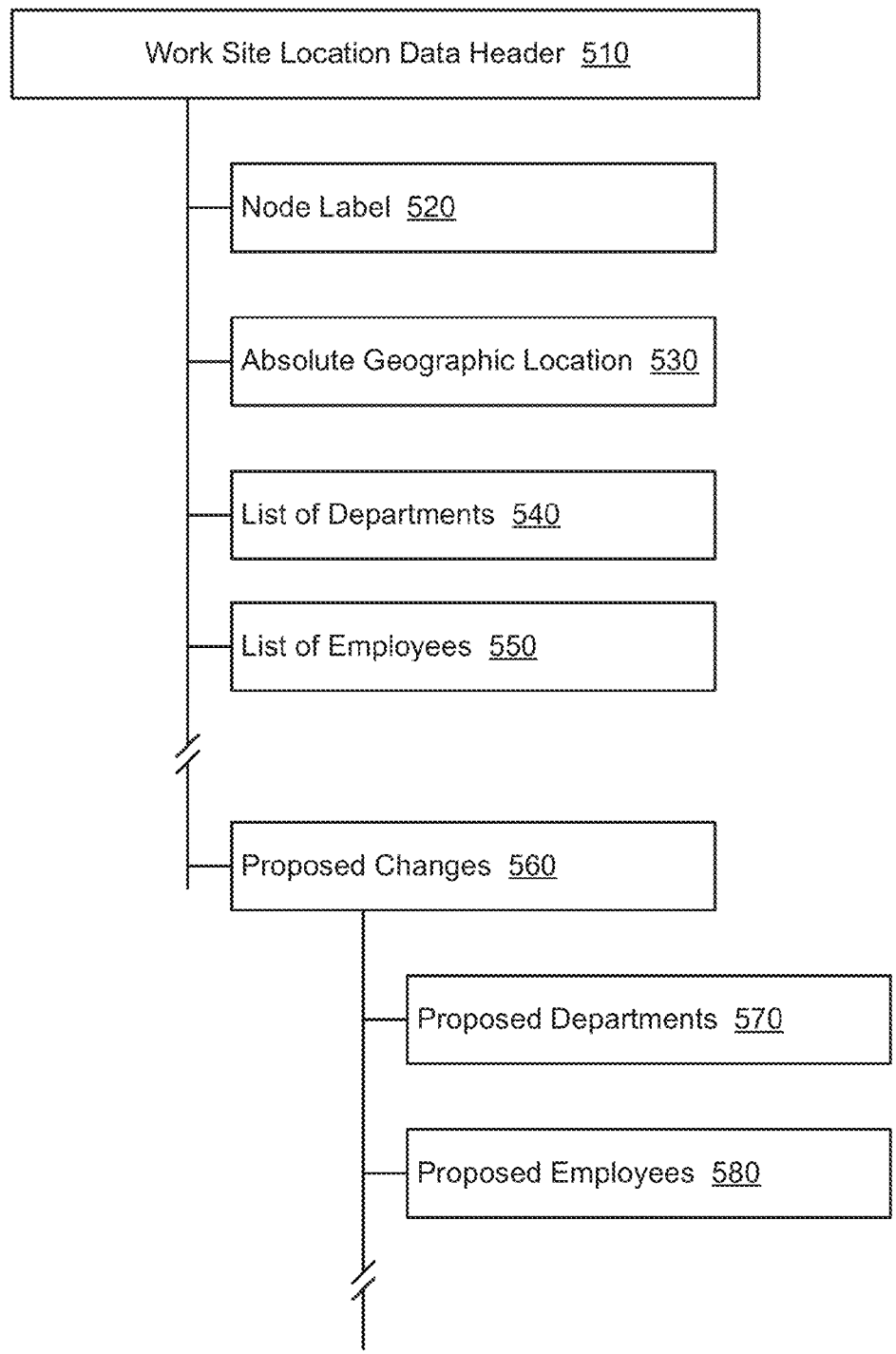
FIG. 5A is a depiction of a data structure for storing attributes of managed locations, according to some embodiments.

FIG. 5A is a depiction of a data structure for storing attributes of managed locations. As an option, the present a data structure 500 may be implemented in the context of the architecture and functionality of the embodiments described herein. Also, the data structure 500 for storing attributes of managed locations can be used within any module and/or any access may be carried out in any desired environment.

The work site location data header 510 can serve as an entry point to constituent data. For example, work site location data header 510 can comprise metadata pertaining to the constituent data. The constituent data can comprise (but is not limited to) a node label 520, an absolute geographic location 530 (e.g., a mailing address), a list of departments 540, a list of employees 550, and so on.

Additionally, the present data structure can serve as a repository for what-if data. For example, a set of proposed changes can be amalgamated under a proposed changes header 560, which in turn can comprise any manner of what-if data, such as a list of proposed departments 570, a list of proposed employees 580, if the location is near a train stop, who is the general manager, and so on.

Figure 5B:
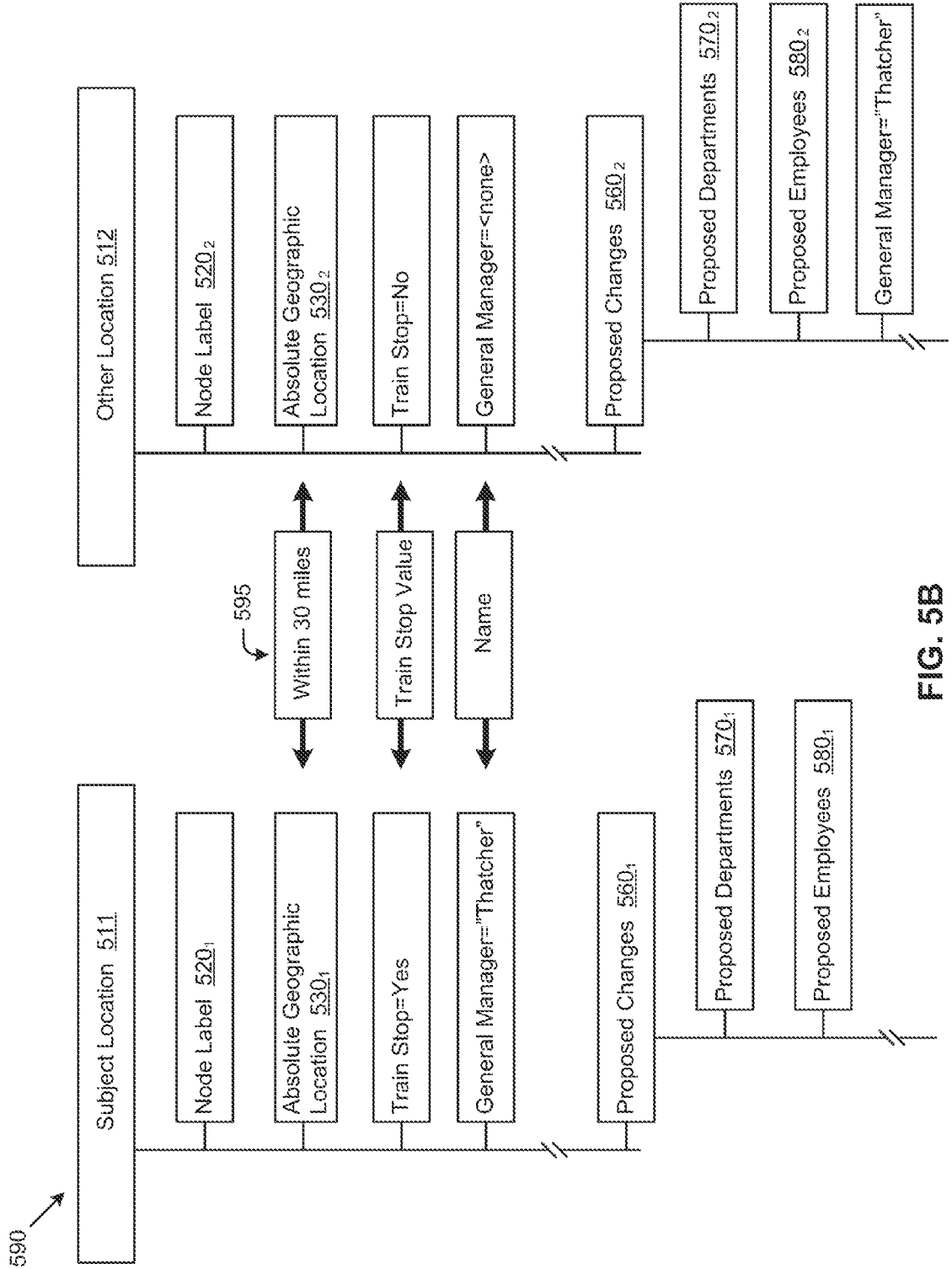
FIG. 5B is a diagram of a two data structures for forming a relative location graph based on user-specified managed location decision criteria, according to some embodiments.

FIG. 5B is a diagram of a two data structures for forming a relative location graph based on user-specified managed location decision criteria. As an option, the present two data structures 590 may be implemented in the context of the architecture and functionality of the embodiments described herein. Also, the two data structures 590 showing correlated criteria can be used within any module or and/or any access may be carried in any desired environment.

As shown, the two data structures are organized into a first data structure for a subject location 511 and a second data structure for other location 512. Each data structure can comprise its own data contents and values. For example, subject location 511 can comprise a subject node label (e.g., node label $520_1$) and the other location 512 can comprise a second node label (e.g., node label $520_2$). Moreover, each data structure can comprise data contents and values to be used in decision criteria. For example, a selection of nodes might be displayed within a relative location graph based on the criterion 595 that the locations are within 30 miles of the subject location's absolute geographic location. Or, a selection of nodes might be displayed together with node display characteristics $132_1$ including values based on the criterion 595.

In some embodiments a query language might be used (e.g., SQL), and such a query language might support user-specification of arbitrarily complex criteria. Strictly as further examples, a particular criterion 595 might specify the display of nodes only when the value of a binary data item (e.g., "Train Stop") has the sense of TRUE (e.g., equal to "Yes"). Or, a particular criterion 595 might specify the display of nodes only when the value of a certain data item (e.g., "General Manager") has the sense of "Unassigned" (e.g., value equal to "none"). Of course a plurality of instances of criterion 595 can be used in any combination so as to establish the nodes and edges used when forming a relative location graph (e.g., based on the user-specified managed location decision criteria).

Figure 6:
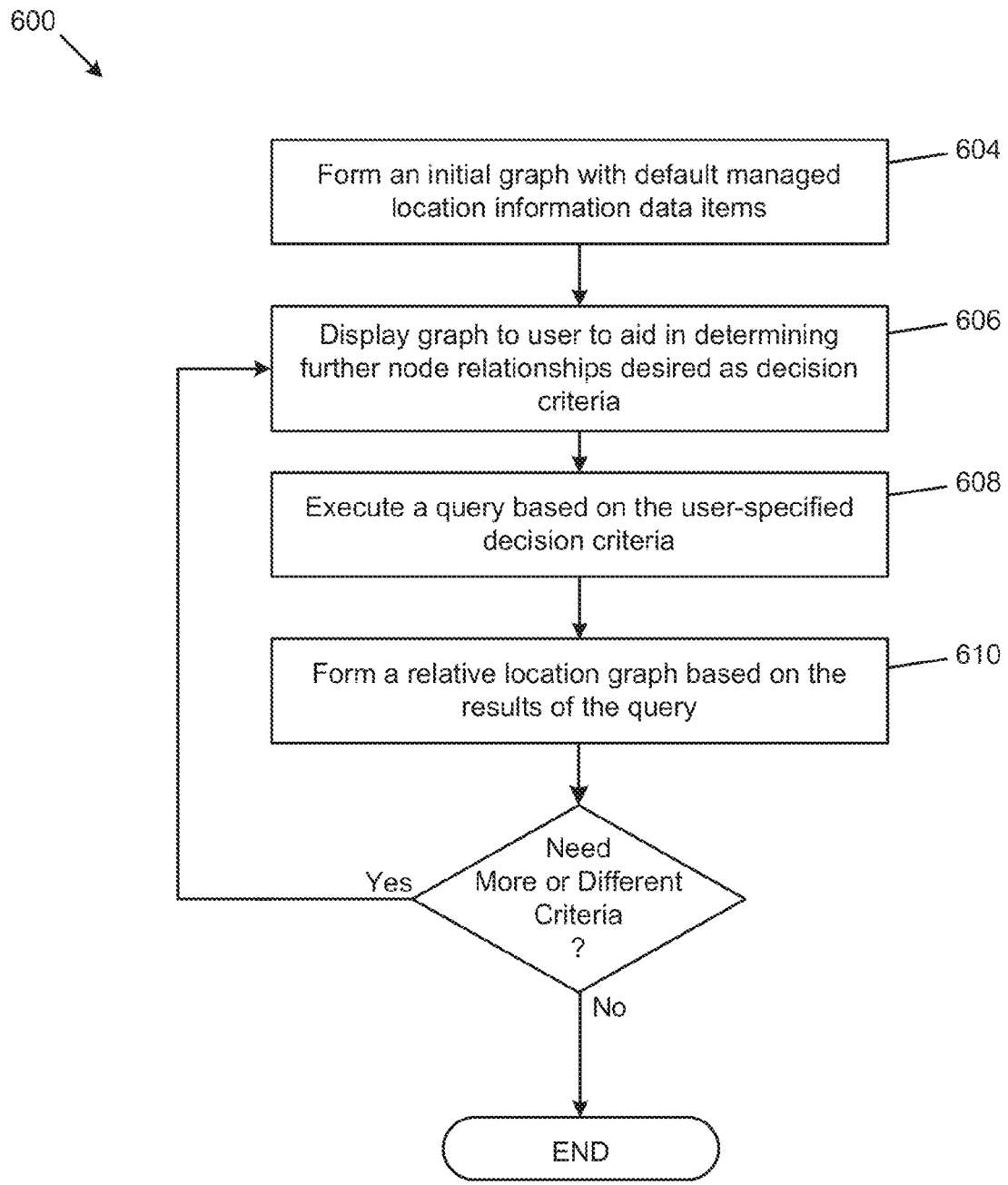
FIG. 6 is a flow chart of a method for forming a relative location graph based on user-specified managed location decision criteria, according to some embodiments.

FIG. 6 is a flow chart of a method for forming a relative location graph based on user-specified managed location decision criteria. As an option, the present method 600 may be implemented in the context of the architecture and functionality of the embodiments described herein. Also, the method 600 for performing what-if analysis within a module or any operation therein may be carried out in any desired environment. Also, the method 600 or any operation therein may be implemented in any desired environment. As shown, the method 600 commences when the method forms an initial graph with default managed location information data items (see operation 604), and displays the graph to a user to aid in determining further node relationships desired as decision criteria (see operation 606). The user might then make determinations as to what data items, or data item values, could be used in assessing various what-if scenarios. The method continues when the user (or application) executes a query based on the user-specified decision criteria (see operation 608), the results of which query are used to form a relative location graph having at least some of the query results displayed as a node label, or as an edge label, or as instances of node display characteristics 132 (see operation 610). The user might then further evaluate the graph and consider assessing other what-if scenarios. In some cases, the user might determine that additional (or different) decision criteria are needed to perform such an assessment, and accordingly, the user might need to determine further node relationships (and thus might return to operation 606).

Figure 7A:
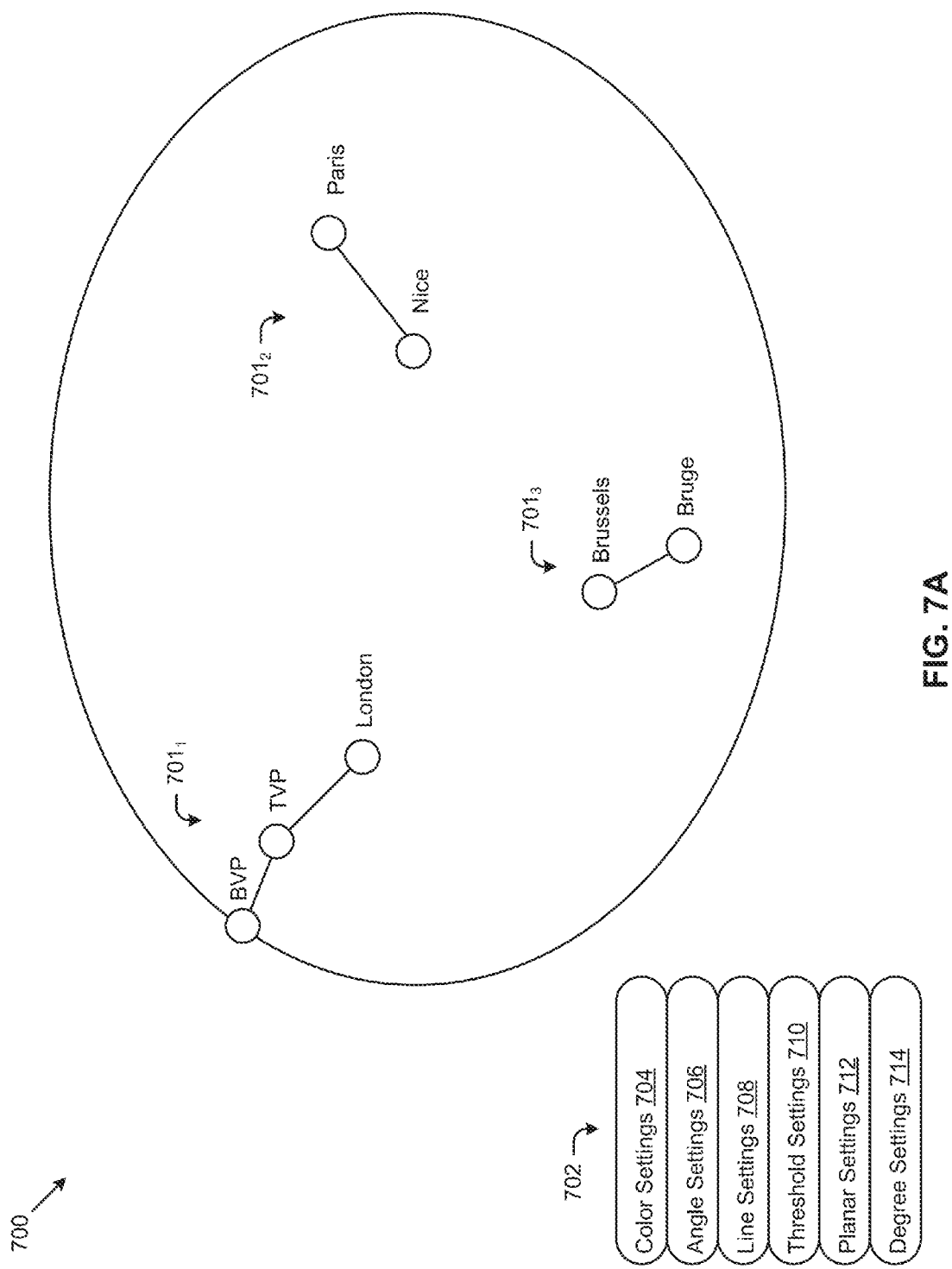
FIG. 7A is a diagram of a relative location graph using thresholds, according to some embodiments.

FIG. 7A is a diagram of a relative location graph using thresholds. As an option, the present relative location graph 700 may be implemented in the context of the architecture and functionality of the embodiments described herein. Also, the relative location graph 700 for performing what-if analysis can be implemented within a module and any aspect therein may be implemented in any desired environment. Additionally, the relative location graph 700 exemplifies use of thresholds in displaying user-specified managed location decision criteria. More particularly, certain edges in a graph might not be present based on a threshold. In the example of FIG. 7, there are three clusters of nodes, namely cluster $701_1$, cluster $701_2$, and cluster $701_3$. Even though it is reasonable that there might exist an edge between (for example) London and Brussels, and another edge between London and Paris, in the embodiments shown, those edges are not present. Various forms of display characteristics of the edges can be determined based on user-selected criteria, and the display characteristics can include any one or more threshold settings.

Continuing this example, the threshold in operation for the relative location graph 700 can be described as, "only show edges between any pair of nodes where the managed location corresponding to both of the pair of nodes is situated in the same country". Thus, as shown, the cluster $701_1$ comprises three locations in the UK, the cluster $701_2$ comprises two locations in France, and the cluster $701_3$ comprises two locations in the Belgium.

Of course, the foregoing is merely exemplary, and any variety of threshold criteria are reasonable and envisioned. Strictly as another example, an edge between two nodes might be suppressed (e.g., not shown) when there is no common department shared between the two nodes. Use of thresholds can be combined with any of the aforementioned techniques. Threshold settings and other display control settings can be defined via user using screen controls 702 (e.g., threshold settings 710). In some embodiments, other controls are provided to facilitate display of the relative location graph to facilitate user understanding. For example, screen controls for color (e.g., color settings 704), angle (e.g., angle settings 706), lines (e.g., line settings 708), planarity (e.g., planar settings 712), and degree (e.g., degree settings 714) can be present in any embodiment.

Strictly as an example, the angle settings might be set to follow "angle based on geographic location". As shown, the managed site "TVP" is northwest of London, and the managed site "BVP" is further northwest of "TVP". Of course it might be convenient to apply a display setting (e.g., angle setting 706) to one cluster and not to another cluster. Or even it might be convenient to apply one particular display setting to one cluster and a different display setting to another cluster.

Strictly as an example, the degree settings might be set to follow "create edges up to first degree". Thus, following an example patterned after of FIG. 7A, even though the location "London" and the location "TVP" and the location "BVP" are all within the same country, there is no edge between "London" and "BVP" as such an edge (if it were rendered) would violate the "create edges up to first degree" degree setting.

Figure 7B:
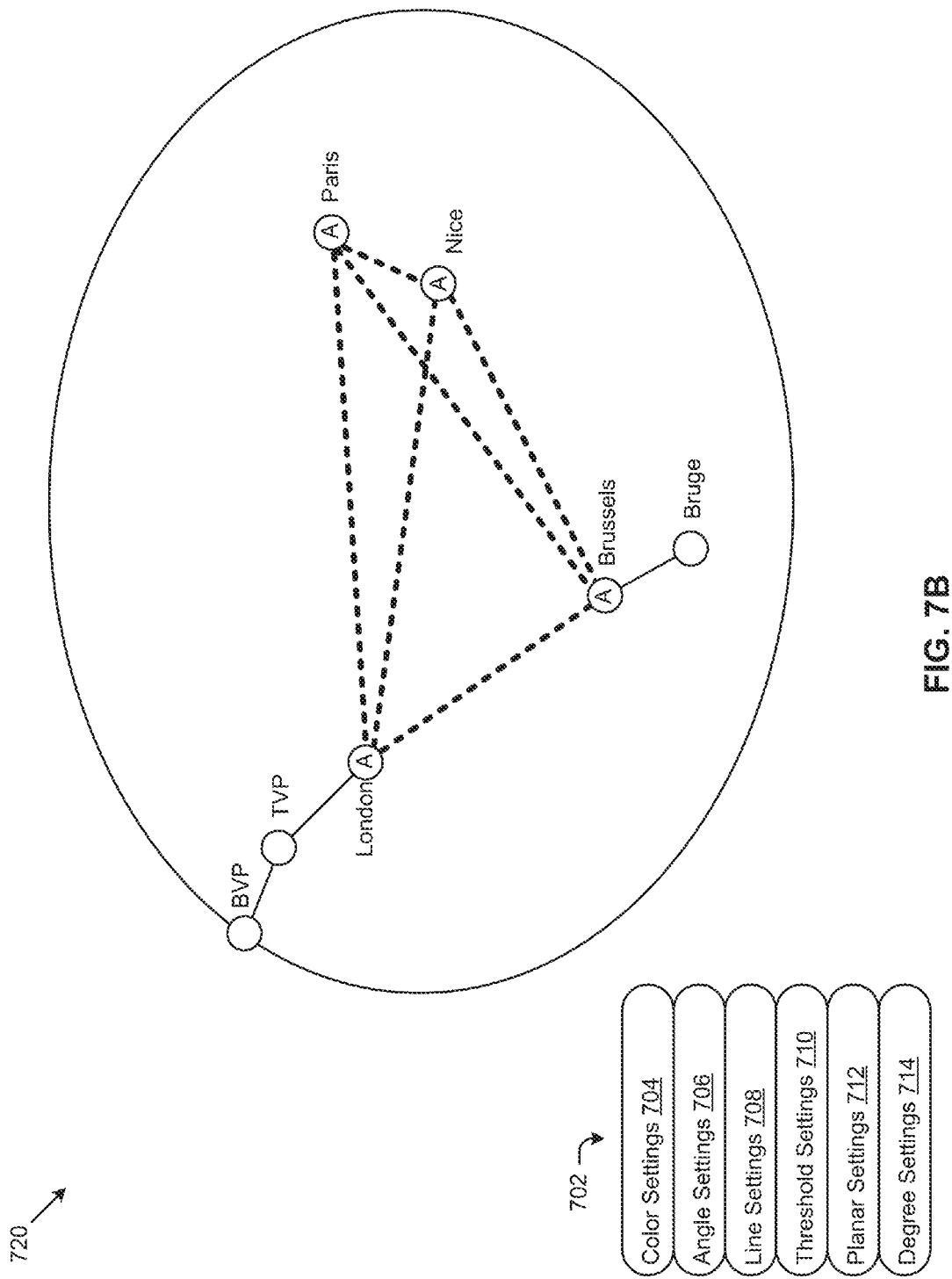
FIG. 7B is a diagram of a relative location graph showing a non-planar layout, according to some embodiments.

FIG. 7B is a diagram of a relative location graph showing a non-planar layout, according to some embodiments. As an option, the present relative location graph 720 may be implemented in the context of the architecture and functionality of the embodiments described herein. Also, the relative location graph 720 for performing what-if analysis can be implemented within a module and any aspect therein may be implemented in any desired environment. As shown, the layout exemplifies the situation when edges between nodes overlap. Suppose the highlighted edges are defined by the occurrence of "Department 'A'" at the location depicted by the letter 'A' in the location node. In some cases, merely rendering edges between the locations having an occurrence of Department 'A' results in a non-planar arrangement. Such a non-planar arrangement can sometimes be reformed into a planar arrangement, and the user can interact with screen controls 702 in order to affect planarity (e.g., via planar settings 712). In some cases, a planar arrangement is possible (see FIG. 7C) and can result in a rendering suited for what-if analysis.

Figure 7C:
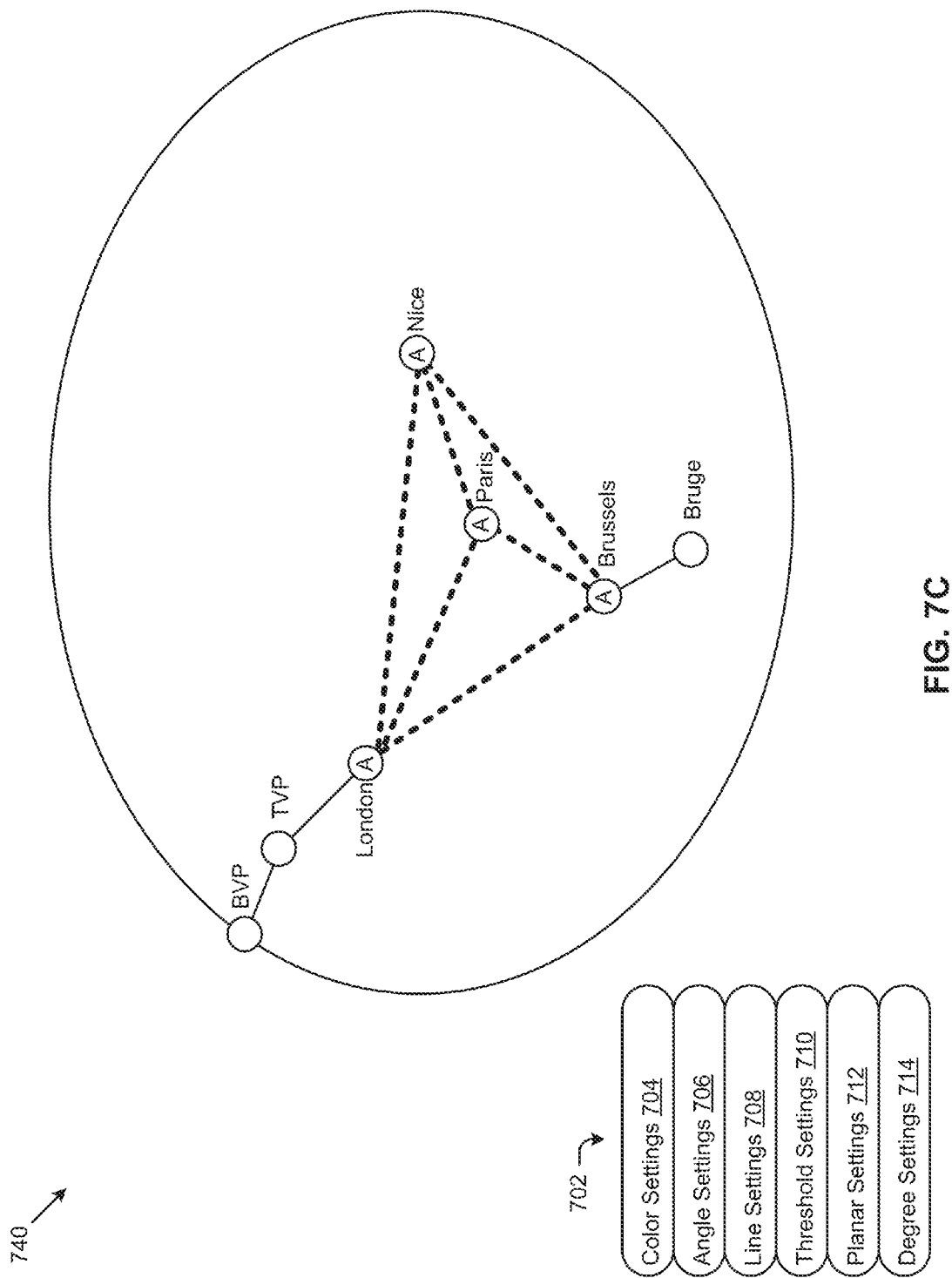
FIG. 7C is a diagram of a relative location graph showing a planar layout, according to some embodiments.

FIG. 7C is a diagram of a relative location graph showing a planar layout, according to some embodiments. As an option, the present relative location graph 740 may be implemented in the context of the architecture and functionality of the embodiments described herein. Also, the relative location graph 740 for performing what-if analysis can be implemented within a module and any aspect therein may be implemented in any desired environment. As shown, the layout exemplifies the situation when nodes are repositioned within a plane so as to eliminate overlapping edges. In some cases, when a node or nodes are moved within a plane so as to eliminate overlapping edges, the movement of the node or nodes may override and violate other controls. For example, and as shown in FIG. 7C, moving the node "Paris" to a location below "Nice" would violate angle settings if the angle settings had been set to follow layout rules for "angle based on geographic location". Thus, when rendering nodes on a relative location graph following certain planar settings, it is possible that the forming operations will serve to reposition at least one of the nodes on the graph in accordance with the user's planar setting.

It can be recognized that the nodes can be shown in a relative location graph such that the user-defined relationships are depicted (e.g., based on user-defined filter criterion). And, if one particular criterion (e.g., the specific function performed at the managed location) is deemed more important than another user-defined criterion (e.g., physical location), then depicting the more important criterion can override the less important criterion. As one specific example, a company may have five managed locations co-located at one geographic site (possibly even in the same edifice), yet, the relative locations maps can depict the five managed sites as five separate nodes even though the five separate nodes are geographically co-located.

Additional Embodiments of the Disclosure

Figure 8:
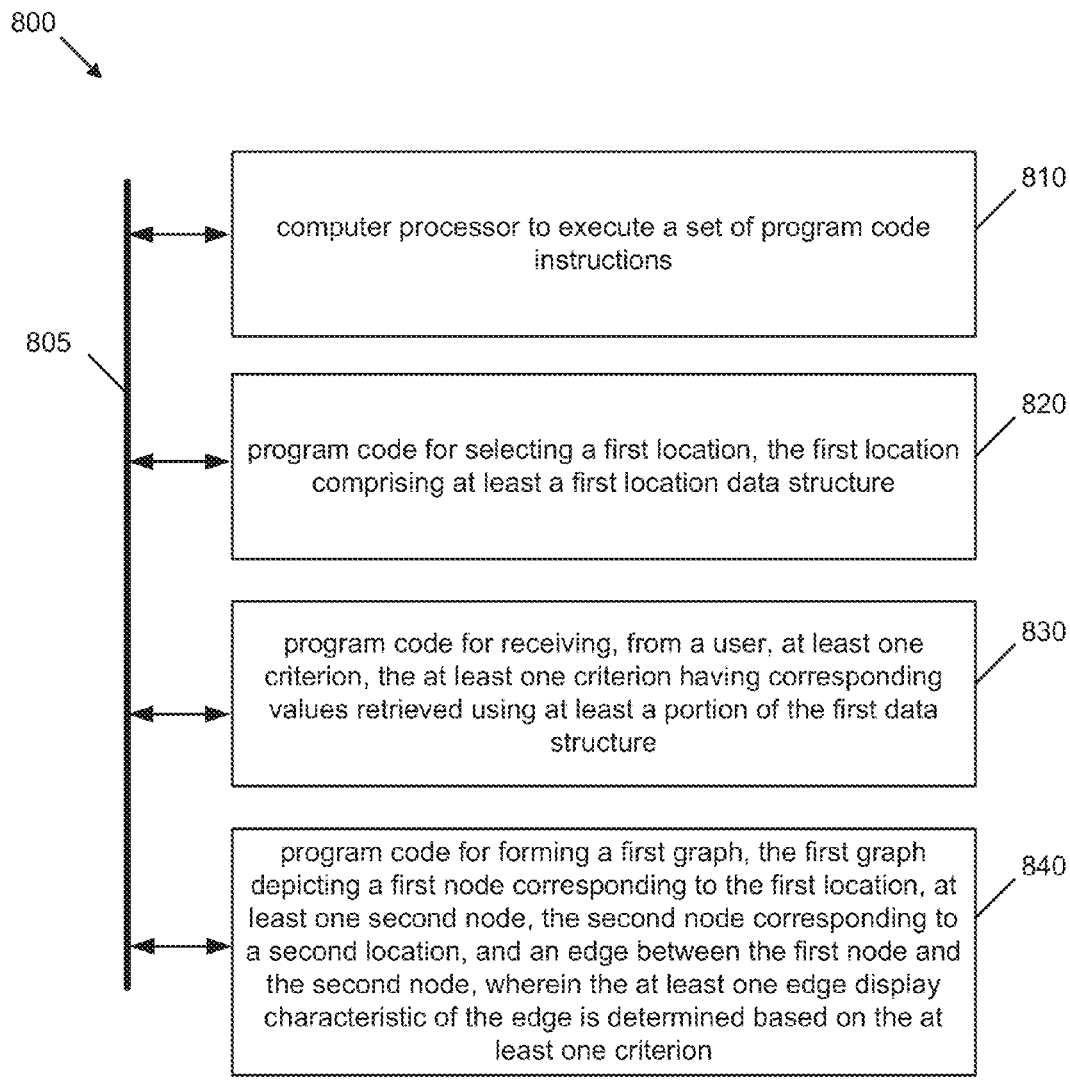
FIG. 8 depicts a block diagram of a system to perform certain functions of a computer system, according to some embodiments.

FIG. 8 depicts a block diagram of a system to perform certain functions of a computer system. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. An operation (e.g. implemented in whole or in part using program instructions accessible by a module) is connected to a communication path 805, and any operation can communicate with other operations over communication path 805. The modules of the system can, individually or in combination, perform method operations within system 800. Any method operations performed within system 800 may be performed in any order unless as may be specified in the claims. As shown, FIG. 8 implements a portion of a computer system, shown as system 800, comprising a computer processor to execute a set of program code instructions (see module 810) and modules for accessing memory to hold program code instructions to perform: selecting a first location, the first location comprising at least a first location data structure (see module 820); receiving at least one criterion, the at least one criterion having corresponding values retrieved using at least a portion of the first data structure (see module 830); forming a first graph, the first graph depicting a first node corresponding to the first location, at least one second node, the second node corresponding to a second location, and an edge between the first node, and the second node; and wherein the at least one edge display characteristic of the edge is determined based on the at least one criterion (see module 840).

System Architecture Overview

Figure 9:
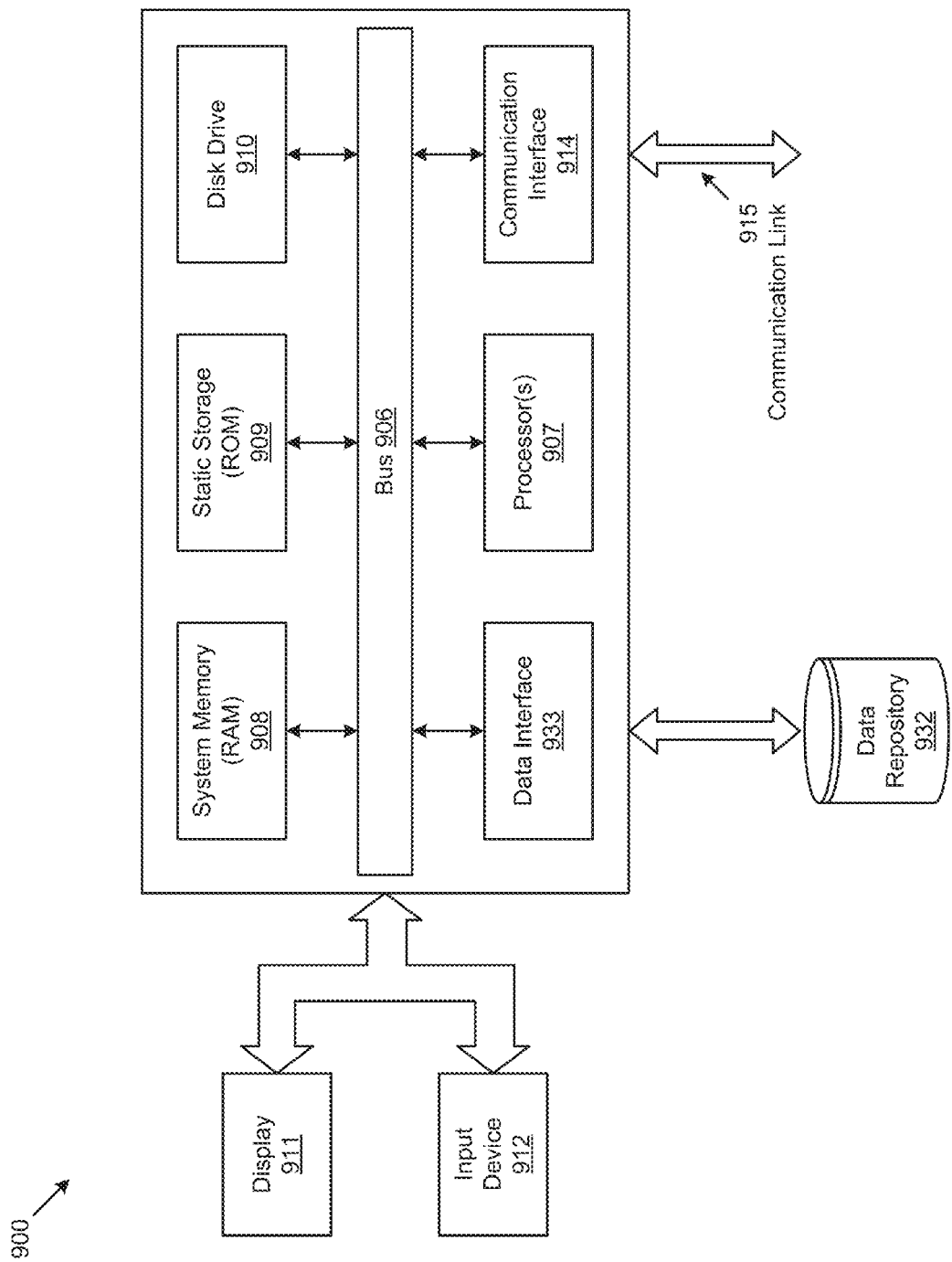
FIG. 9 illustrates a computer system on which an embodiment of the claims can be implemented.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device 909 (e.g., ROM), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 932.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device 909 or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to other embodiments of the disclosure, two or more computer systems 900 coupled by a communication link 915 (e.g., LAN, PTSN, or wireless network) may perform the sequence of instructions required to practice the disclosure in coordination with one another.

Computer system 900 may transmit and receive messages, data, and instructions, including program, i.e., application code, through communication link 915 and communication interface 914. Received program code may be executed by processor 907 as it is received, and/or stored in disk drive 910 or other non-volatile storage for later execution. Computer system 900 may communicate through a data interface 933 to a database on an external data repository 932. A module as used herein can be implemented using any mix of any portions of system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for forming one or more relative location graphs based on at least one decision criterion of a user, comprising:
   storing, in an application table, a plurality of sets of data corresponding to attributes of a plurality of locations, each of the plurality of sets of data corresponding to a respective location of the plurality of locations, and each of the plurality of sets of data comprising a header and one or more values pertaining to the attributes of the respective location;
   receiving user input pertaining to a first location for what-if analysis relative to a one or more second locations, the first location corresponding to a first set of data of the plurality of sets of data, the what-if analysis providing one or more relative location graphs on a display device to visually evaluate a selection of the first location relative to different ones of the one or more second locations;
   receiving the at least one decision criterion from the user, wherein the at least one decision criterion is used to correlate the first location with the one or more second locations, the at least one decision criterion having corresponding values retrieved using at least a portion of the first set of data;
   forming, using an application server, a first graph of the one or more relative location graphs, the first graph comprising a first node corresponding to the first location, a second node corresponding to a particular second location of the one or more second locations, and an edge between the first node and the second node,
   wherein the edge includes at least one edge display characteristic based at least in part upon the at least one decision criterion, wherein the edge is rendered to visually represent a characteristic specified by the at least one decision criterion rather than representing a geographic distance between the first location and the particular second location.

2. The method of claim 1, further comprising selecting a plurality of instances of the particular second location.

3. The method of claim 1, further comprising displaying, on a display surface, the first graph.

4. The method of claim 3, wherein displaying the first graph comprises forming an edge label adjacent to the edge.

5. The method of claim 1, wherein the at least one edge display characteristic of the edge comprises at least one of a color setting, an angle setting, a line setting, a threshold setting, a planar setting, a degree setting.

6. The method of claim 1, further comprising forming a second graph to display at least one second decision criterion, the at least one second decision criterion being selected after forming the first graph.

7. The method of claim 1, wherein the second node is repositioned on the first graph in accordance with a planar setting.

8. The method of claim 1, further comprising:
   receiving at least one second decision criterion from the user, the at least one second decision criterion received after the first graph is formed, and the second decision criterion being different from the at least one decision criterion; and
   rendering a second graph based at least in part on the second decision criterion, the second graph being different from the first graph, the second graph also comprising the first node corresponding to the first location and a second node comprising the particular second location and a second edge between the first node and the second node, wherein the second edge between the first node and the second node is different from the edge corresponding to the first graph.

9. A computer system for forming one or more relative location graphs based on at least one decision criterion of a user, comprising:
   a computer processor to execute a set of program code instructions; and
   a memory to hold the program code instructions, in which the program code instructions comprises program code to perform,
   storing, in an application table, a plurality of sets of data corresponding to attributes of a plurality of locations, each of the plurality of sets of data corresponding to a respective location of the plurality of locations, and each of the plurality of sets of data comprising a header and one or more values pertaining to the attributes of the respective location;
   receiving user input pertaining to a first location for what-if analysis relative to a one or more second locations, the first location corresponding to a first set of data of the plurality of sets of data, the what-if analysis providing one or more relative location graphs on a display device to visually evaluate a selection of the first location relative to different ones of the one or more second locations;
   receiving the at least one decision criterion from the user, wherein the at least one decision criterion is used to correlate the first location with the one or more second locations, the at least one decision criterion having corresponding values retrieved using at least a portion of the first set of data;

forming, using an application server, a first graph of the one or more relative location graphs, the first graph comprising a first node corresponding to the first location, a second node corresponding to a particular second location of the one or more second locations, and an edge between the first node and the second node, wherein the edge includes at least one edge display characteristic based at least in part upon the at least one decision criterion, wherein the edge is rendered to visually represent a characteristic specified by the at least one decision criterion rather than representing a geographic distance between the first location and the particular second location.

10. The computer system of claim 9, further comprising selecting a plurality of instances of the particular second location.

11. The computer system of claim 9, further comprising displaying, on a display surface, the first graph.

12. The computer system of claim 11, wherein displaying the first graph comprises forming an edge label adjacent to the edge.

13. The computer system of claim 9, wherein the at least one edge display characteristic of the edge comprises at least one of a color setting, an angle setting, a line setting, a threshold setting, a planar setting, a degree setting.

14. The computer system of claim 9, further comprising forming a second graph to display at least one second decision criterion, the at least one second decision criterion being selected after forming the first graph.

15. The computer system of claim 9, wherein the second node is repositioned on the first graph in accordance with a planar setting.

16. A computer program product embodied in a non-transitory computer readable medium, the computer readable medium having stored thereon a sequence of instructions which, when executed by a processor, causes the processor to execute a method to implement forming one or more relative location graphs based on at least one decision criterion of a user:

storing, in an application table, a plurality of sets of data corresponding to attributes of a plurality of locations, each of the plurality of sets of data corresponding to a respective location of the plurality of locations, and each of the plurality of sets of data comprising a header and one or more values pertaining to the attributes of the respective location;

receiving user input pertaining to a first location for what-if analysis relative to a one or more second locations, the first location corresponding to a first set of data of the plurality of sets of data, the what-if analysis providing one or more relative location graphs on a display device to visually evaluate a selection of the first location relative to different ones of the one or more second locations;

receiving the at least one decision criterion from the user, wherein the at least one decision criterion is used to correlate the first location with the one or more second locations, the at least one decision criterion having corresponding values retrieved using at least a portion of the first set of data;

forming, using an application server, a first graph of the one or more relative location graphs, the first graph comprising a first node corresponding to the first location, a second node corresponding to a particular second location of the one or more second locations, and an edge between the first node and the second node, wherein the edge includes at least one edge display characteristic based at least in part upon the at least one decision criterion, wherein the edge is rendered to visually represent a characteristic specified by the at least one decision criterion rather than representing a geographic distance between the first location and the particular second location.

17. The computer program product of claim 16, further comprising selecting a plurality of instances of the particular second location.

18. The computer program product of claim 16, further comprising displaying, on a display surface, the first graph.

19. The computer program product of claim 18, wherein the at least one edge display characteristic of the edge comprises at least one of a color setting, an angle setting, a line setting, a threshold setting, a planar setting, a degree setting.

20. The computer program product of claim 16, further comprising forming a second graph to display at least one second decision criterion, the at least one second decision criterion being selected after forming the first graph.

21. The computer program product of claim 16, wherein the second node is repositioned on the first graph in accordance with a planar setting.

* * * * *